(12) United States Patent
Futaki

(10) Patent No.: US 12,177,913 B2
(45) Date of Patent: Dec. 24, 2024

(54) RADIO COMMUNICATION SYSTEM, BASE STATION APPARATUS, AND RADIO TERMINAL

(71) Applicant: NEC Corporation, Tokyo (JP)

(72) Inventor: Hisashi Futaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/245,061

(22) Filed: Jan. 10, 2019

(65) Prior Publication Data
US 2019/0150209 A1 May 16, 2019

Related U.S. Application Data

(63) Continuation of application No. 15/033,039, filed as application No. PCT/JP2014/002465 on May 9, 2014, now Pat. No. 10,383,066.

(30) Foreign Application Priority Data

Oct. 31, 2013 (JP) ................................. 2013-227472

(51) Int. Cl.
*H04W 76/15* (2018.01)
*H04W 52/04* (2009.01)
(Continued)

(52) U.S. Cl.
CPC ........... *H04W 76/15* (2018.02); *H04W 52/04* (2013.01); *H04W 52/146* (2013.01);
(Continued)

(58) Field of Classification Search
CPC ... H04W 52/04; H04W 52/146; H04W 52/36; H04W 52/40; H04W 72/0473;
(Continued)

(56) References Cited

U.S. PATENT DOCUMENTS

2008/0220787 A1  9/2008  Stanwood et al.
2009/0204698 A1  8/2009  Yang
(Continued)

FOREIGN PATENT DOCUMENTS

CN  101262679 A  9/2008
CN  101345703 A  1/2009
(Continued)

OTHER PUBLICATIONS

Non-final U.S. Office Action dated Oct. 2, 2019, issued in co-pending U.S. Appl. No. 16/041,114.
(Continued)

*Primary Examiner* — Jason E Mattis
*Assistant Examiner* — Bao G Nguyen

(57) ABSTRACT

A radio communication system includes a radio access network (1) and a radio terminal (2). The radio access network (1) includes a first base station (11) that manages a first cell (110) and a second base station (12) that manages a second cell (120). The radio terminal (2) supports dual connectivity involving a bearer split in which a network bearer between the radio terminal (2) and a core network (3) is split over the first base station (11) and the second base station (12). The radio access network (1) is configured to transmit, to the radio terminal (2), first control information that relates to an access stratum and is necessary for the dual connectivity involving the bearer split. It is thus possible to provide, for example, a control procedure or signalling necessary for starting dual connectivity involving a bearer split.

2 Claims, 10 Drawing Sheets

(51) Int. Cl.

| | | |
|---|---|---|
| H04W 52/14 | (2009.01) | |
| H04W 52/36 | (2009.01) | |
| H04W 52/40 | (2009.01) | |
| H04W 72/044 | (2023.01) | |
| H04W 72/21 | (2023.01) | |
| H04W 72/566 | (2023.01) | |
| H04W 74/00 | (2009.01) | |
| H04W 76/11 | (2018.01) | |
| H04W 76/27 | (2018.01) | |
| H04W 88/10 | (2009.01) | |
| H04W 92/20 | (2009.01) | |

(52) U.S. Cl.
CPC ........... *H04W 52/36* (2013.01); *H04W 52/40* (2013.01); *H04W 72/0473* (2013.01); *H04W 72/21* (2023.01); *H04W 72/566* (2023.01); *H04W 74/004* (2013.01); *H04W 74/006* (2013.01); *H04W 76/11* (2018.02); *H04W 76/27* (2018.02); *H04W 88/10* (2013.01); *H04W 92/20* (2013.01)

(58) Field of Classification Search
CPC ......... H04W 72/1247; H04W 72/1284; H04W 74/004; H04W 74/006; H04W 76/11; H04W 76/15; H04W 76/27; H04W 88/10; H04W 92/20
See application file for complete search history.

(56) References Cited

U.S. PATENT DOCUMENTS

| | | |
|---|---|---|
| 2010/0271970 A1 | 10/2010 | Pan et al. |
| 2011/0096663 A1 | 4/2011 | Li et al. |
| 2011/0249578 A1 | 10/2011 | Nayeb Nazar et al. |
| 2011/0275403 A1 | 11/2011 | Chen et al. |
| 2011/0310986 A1 | 12/2011 | Heo et al. |
| 2013/0064191 A1 | 3/2013 | Jeong et al. |
| 2013/0077571 A1 | 3/2013 | Papasakellariou et al. |
| 2013/0176953 A1* | 7/2013 | Stern-Berkowitz ........... H04W 52/281 370/329 |
| 2013/0260735 A1 | 10/2013 | Dinan |
| 2014/0022990 A1 | 1/2014 | Guo et al. |
| 2014/0098746 A1* | 4/2014 | Luo ........................ H04L 1/0006 370/328 |
| 2014/0198734 A1 | 7/2014 | Yamada et al. |
| 2014/0241281 A1* | 8/2014 | Wu ........................ H04W 76/15 370/329 |
| 2014/0241317 A1 | 8/2014 | Jamadagni et al. |
| 2014/0254476 A1 | 9/2014 | Blankenship et al. |
| 2014/0269575 A1 | 9/2014 | Zhang et al. |
| 2014/0301308 A1* | 10/2014 | Hahn ..................... H04W 76/11 370/329 |
| 2014/0355562 A1 | 12/2014 | Gao et al. |
| 2014/0362829 A1 | 12/2014 | Kazmi et al. |
| 2015/0085800 A1* | 3/2015 | Sivanesan ............. H04L 5/0055 370/329 |
| 2015/0319703 A1* | 11/2015 | Kwon ................ H04W 72/1268 370/329 |
| 2015/0341864 A1* | 11/2015 | Yang .................... H04W 52/50 455/522 |
| 2015/0358915 A1* | 12/2015 | Semaan .............. H04W 52/367 370/329 |
| 2016/0021581 A1 | 1/2016 | Deenoo et al. |
| 2016/0174160 A1 | 6/2016 | Shen et al. |
| 2016/0174172 A1* | 6/2016 | Rahman .............. H04W 52/362 455/522 |
| 2016/0212775 A1 | 7/2016 | Xu et al. |
| 2016/0234714 A1* | 8/2016 | Basu Mallick ... H04W 28/0278 |
| 2016/0242128 A1 | 8/2016 | Loehr et al. |
| 2016/0242193 A1 | 8/2016 | Hong et al. |

FOREIGN PATENT DOCUMENTS

| | | |
|---|---|---|
| CN | 101932070 A | 12/2010 |
| CN | 102301800 A | 12/2011 |
| CN | 102647265 A | 8/2012 |
| CN | 103327595 A | 9/2013 |
| EP | 2701446 A1 | 2/2014 |
| JP | 2014-039124 A | 2/2014 |
| WO | WO 2009/089987 A1 | 7/2009 |
| WO | WO 2011/135096 A1 | 11/2011 |
| WO | WO 2012/144362 A1 | 10/2012 |
| WO | WO 2013/133871 A1 | 9/2013 |
| WO | WO 2014/181152 A1 | 11/2014 |
| WO | WO 2015/018348 A1 | 2/2015 |
| WO | WO 2015/045283 A | 4/2015 |

OTHER PUBLICATIONS

Office Action issued in Australian Patent Application No. 2018200493, dated Sep. 4, 2018.

Office Action issue in Chinese Application No. 201480060250.2, dated Sep. 4, 2018.

Extended European Search Report issued by the European Patent Office for European Application No. 14856858. 7 dated Aug. 14, 2017 (23 pages).

Fujitsu, "Discussion on physical layer impacts of dual connectivity," 3GPP TSG RAN WG1 Meeting #74, R1-133138, Agenda Item 7.2.6.3, Barcelona, Spain, 5 pages (Aug. 19-23, 2013).

Pantech, "Challenge on UL transmission of dual connectivity," 3GPP TSG-RAN WG2 Meeting #83, R2-132504, Agenda Item 7.2.1, Barcelona, Spain, 8 pages (Aug. 19-23, 2013).

Renesas Mobile Europe, "User plane details related to the SCE user plane architecture selection," 3GPP TSG-RAN WG2 Meeting #83-bis, R2-133310, Ljubljana, Slovenia, 3 pages (Oct. 7-11, 2013).

Intel Corporation, "Detailed signaling procedure for dual connectivity," 3GPP TSG-RAN2 Meeting #83bis, R2-133491, Agenda Item 7.2.2, Ljublijana, Slovenia, Oct. 7-11, 2013 (5 pages).

Japanese Office Action issued by the Japan Patent Office for Japanese Application No. 2015-544755 dated Apr. 17, 2018 (7 pages).

3GPP TR 36.842 V0.4.0 (Oct. 2013) Technical Report, 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), pp. 1-52 (Oct. 2013).

ETRI, "Discussion on Traffic handling for Dual Connectivity," 3GPP TSG-RAN WG2 #83, R2-132481, Agenda Item 7.2.4, Barcelona, Spain, Aug. 19-23, 2013 (4 pages).

Intel Corporation, "Impacts of Splitting a Single EPS Bearer between Two (or more) eNBs," 3GPP TSG RAN WG2 Meeting #81 bis, R2-131529, Agenda Item 7.2, Chicago, USA, Apr. 15-19, 2013 (1 O pages).

Partial Supplementary European Search Report issued by the European Patent Office for European Application No. 14856858.7 dated Jun. 1, 2017 (20 pages).

Sesia, S., et al., "L TE—the UMTS long term evolution: from theory to practice," Network Architecture, Wiley, Chichester, XP002770288, pp. 34-38 (Aug. 31, 2011).

International Search Report corresponding to PCT/JP2014/002465 mailed Jul. 22, 2014 (2 pages).

Huawei, HiSilicon, Solution for Reduction of Signalling Load towards Core Network, 3GPP TSG-RAN WG2#83, R2-132853, Aug. 23, 2013 (4 pages).

LG Electronics Inc., Throughput enhancement by bearer splitting for dual connectivity, 3GPP TSG-RAN WG2#83bis, R2-133537, Oct. 11, 2013 (pp. 1-3).

BlackBerry UK Limited, U-plan Architecture Alternatives for RRC Message Transmission, 3GPP TSG-RAN WG2#83bis, R2-133334, Oct. 11, 2013 (pp. 1-6).

Fujitsu, Initial analysis on the potential impact of Small Cell UP/CP alternatives on RAN3 specs, 3GPP TSG-RAN WG3#81 bis, R3-131755, Oct. 11, 2013 (4 pages).

(56) References Cited

OTHER PUBLICATIONS

3GPP TS 36.300 V11.5.0 (Mar. 2013), Evolved Universal Terrestrial Radio Access (E-UTRA) and Evolved Universal Terrestrial Radio Access Network (E-UTRAN); Overall description; Stage 2; Release 11, Mar. 2013 (pp. 1-209).
3GPP TS 36.331 V11.4.0 (Jun. 2013), Evolved Universal Terrestrial Radio Access (E-UTRA); Radio Resource Control (RRC); Protocol specification; Release 11, Jun. 2013 (pp. 1-346).
3GPP TR 36.842 V0.2.0 (May 2013), Evolved Universal Terrestrial Radio Access (E-UTRA); Study on Small Cell Enhancements for E-UTRA and E-UTRAN—Higher layer aspects; Release 12, May 2013 (pp. 1-38).
Notification of Reasons for Refusal of the counterpart Japanese Patent Application No. 2018-134701 dated Mar. 12, 2019.
3GPP TSG-RAN WG1 Meeting #74, "Physical layer aspects for dual layer connectivity in small cells" R1-133345 (Aug. 10, 2013).
3GPP TSG RAN #83bis Meeting, "UP architecture 3: Alternatives 3C & 3D" R2-133557, Media Tek Inc. (Sep. 28, 2013).
Notification of Reasons for Refusal of the counterpart Japanese Patent Application No. 2018-112030 dated Feb. 12, 2019.
Office Action issued on Nov. 17, 2017, by the United States Patent and Trademark Office in counterpart U.S. Appl. No. 15/033,039.
3GPP TSG-RAN WG2 Meeting #83, "Considerations on the CP Architecture", R2-132878, pp. 1-7 (Aug. 10, 2013).
3GPP TSG RAN WG2 Meeting #83bis, "Issues in SeNB reconfiguration and SeNB change", R2-133576, pp. 1-4 (Sep. 28, 2013).
3GPP TSG-RAN WG2 Meeting #83, "On protocol stack impacts of dual connectivity", R2-132405, pp. 1-6 (Aug. 9, 2013).
Office Action, dated Mar. 18, 2020, issued by the Australian Patent Office in counterpart Australian Patent Application No. 2019203201.
Office Action dated Mar. 5, 2020, issued in counterpart U.S. Appl. No. 16/041,114.
Office Action, dated Aug. 17, 2020, issued by the United States Patent Office in counterpart U.S. Appl. No. 16/041,114.
U.S. Office Action and PTO-892 for U.S. Appl. No. 16/041,114 mailed on Mar. 4, 2021.
Extended European Search Report for EP Application No. 20202426.1 dated on Feb. 1, 2021.
NTT DOCOMO et al., "RAN2 status on Small Cell Enhancements", 3GPP Draft; R3-131123, TSG RAN WG3 #80, May 23, 2013, Japan.
Intel Corporation: "Impacts of Splitting a Single EPS Bearer between Two (or more) eNBs", 3GPP Draft; R2-131401, TSG RAN WG2 #81bis, Apr. 6, 2013, USA.
Intel Corporation: "User plane architecture for Dual Connectivity", 3GPP Draft; R2-131982, TSG RAN WG2 #82, May 11, 2013, Japan.
Chinese Office Action for CN Application No. 201910976524.7 mailed on Mar. 11, 2022 with English Translation.
Chinese Office Action for CN Application No. 201910977220.2 mailed on Feb. 23, 2022 with English Translation.
Chinese Office Communication for CN Application No. 201910976524.7 issued on Jul. 29, 2022 with English Translation.
EP Office Action for EP Application No. 20202426.1, mailed on Feb. 23, 2023.
Stefania Sesia, Issam Toufik and Matthew Baker, XP055349815, "LTE, The UMTS Long Term Evolution: From Theory to Practice", Second Edition, pp. 189-244, Jul. 22, 2011.

* cited by examiner

RADIO COMMUNICATION SYSTEM, BASE STATION APPARATUS, AND RADIO TERMINAL

CROSS-REFERENCE TO RELATED PATENT APPLICATIONS

This application is a continuation of U.S. patent application Ser. No. 15/033,039, filed Apr. 28, 2016, which is a National Stage Entry of International Application No. PCT/JP2014/002465, filed May 9, 2014, which claims priority from Japanese Patent Application No. 2013-227472, filed Oct. 31, 2013. The entire contents of the above-referenced applications are expressly incorporated herein by reference.

TECHNICAL FIELD

This application relates to a radio communication system in which base stations communicate with the same radio terminal in their respective cells.

BACKGROUND ART

To improve deterioration in communication quality due to the recent rapid increase in mobile traffic and to achieve higher-speed communication, 3GPP Long Term Evolution (LTE) specifies a carrier aggregation (CA) function to allow a radio base station (eNode B (eNB)) and a radio terminal (User Equipment (UE)) to communicate with each other using a plurality of cells. The cells which can be used by the UE in the CA are limited to cells of one eNB (i.e., cells that are served or managed by the eNB). The cells used by the UE in the CA are classified into a primary cell (PCell) that is already used as a serving cell when the CA is started and a secondary cell(s) (SCell(s)) that is used additionally or subordinately. In the PCell, Non Access Stratum (NAS) mobility information (NAS mobility information) and security information (security input) is sent and received during radio connection (re)-establishment (RRC Connection Establishment, RRC Connection Re-establishment) (see Section 7.5 in Non-Patent Literature 1).

In the CA, SCell configuration information transmitted from the eNB to the UE includes SCell radio resource configuration information common to UEs (RadioResourceConfigCommonSCell) and SCell radio resource configuration information dedicated to a specific UE (RadioResourceConfigDedicatedSCell). The latter information mainly indicates a dedicated configuration (PhysicalConfigDedicated) for a physical layer. When cells (carriers) having different transmission timings (Timing Advance: TA) are aggregated in an uplink, configuration information (MAC-MainConfigSCell) about a Medium Access Control (MAC) sublayer is also transmitted from the eNB to the UE. However, the configuration information about the MAC sublayer includes only an STAG-Id, which is an index of TA Group (TAG) representing a set of cells included in the same TA (see Section 5.3.10.4 in Non-Patent Literature 2). The other configurations for the MAC sublayer in the SCell are the same as those in the PCell.

One of the ongoing study items in the LTE standardization related mainly to a Heterogeneous Network (HetNet) environment is dual connectivity in which the UE performs communication using a plurality of cells of a plurality of eNBs (see Non Patent-Literature 3). Dual connectivity is a process to allow an UE to perform communication simultaneously using both radio resources (i.e., cells or carriers) provided (or managed) by a main base station (master base station, Master eNB (MeNB)) and a sub base station (secondary base station, Secondary eNB (SeNB)). Dual connectivity enables inter-eNB CA in which the UE aggregates a plurality of cells managed by different eNBs. Since the UE aggregates radio resources managed by different nodes, dual connectivity is also called "inter-node radio resource aggregation". The MeNB is connected to the SeNB through an inter-base-station interface called Xn. The MeNB maintains, for the UE in dual connectivity, the connection (S1-MME) to a mobility management apparatus (Mobility Management Entity (MME)) in a core network (Evolved Packet Core (EPC)). Accordingly, the MeNB can be called a mobility management point (or mobility anchor) of the UE. For example, the MeNB is a Macro eNB, and the SeNB is a Pico eNB or Low Power Node (LPN).

Further, in dual connectivity, a bearer split for splitting a network bearer (EPS bearer) over the MeNB and the SeNB has been studied. The term "network bearer (EPS Bearer)" used in this specification means a virtual connection that is configured between a UE and an endpoint (i.e., Packet Data Network Gateway (P-GW)) in a core network (EPC) for each service provided to the UE. In an alternative of the bearer split, for example, both a radio bearer (RB) in a cell of the MeNB and a radio bearer in a cell of the SeNB are mapped to one network bearer. The radio bearer (RB) described herein refers mainly to a data radio bearer (DRB). The bearer split will contribute to a further improvement in user throughput.

CITATION LIST

Non Patent Literature

[Non-Patent Literature 1] 3GPP TS 36.300 V11.5.0 (2013-03), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", March, 2013

[Non-Patent Literature 2] 3GPP TS 36.331 V 11.4.0 (2013-06), "3rd Generation Partnership Project; Technical Specification Group Radio Access Network; Evolved Universal Terrestrial Radio Access (E-UTRA); Radio Resource Control (RRC); Protocol specification (Release 11)", June, 2013

[Non-Patent Literature 3] 3GPP TR 36.842 V0.2.0 (2013-05), "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", May, 2013

SUMMARY OF INVENTION

Technical Problem

An adequate control procedure for starting dual connectivity involving a bearer split has not been established. Accordingly, an object to be achieved by embodiments disclosed in the specification is to provide a control procedure or signalling necessary for starting dual connectivity involving a bearer split. Other objects and novel features will become apparent from the following description and the accompanying drawings.

Solution to Problem

In an embodiment, a radio communication system includes a radio access network and a radio terminal. The radio access network includes a first base station that manages a first cell and a second base station that manages a second cell. The radio terminal supports dual connectivity involving a bearer split in which a network bearer between the radio terminal and a core network is split over the first base station and the second base station. The radio access network is configured to transmit, to the radio terminal, first control information relates to an access stratum and is necessary for the dual connectivity involving the bearer split.

In an embodiment, a base station apparatus includes a communication control unit configured to control dual connectivity involving a bearer split in which a network bearer between a radio terminal and a core network is split over the base station apparatus and a neighbor base station. The communication control unit is configured to transmit, to the radio terminal, first control information that relates to an access stratum and is necessary for the dual connectivity involving the bearer split.

In an embodiment, a radio terminal includes a communication control unit configured to control dual connectivity involving a bearer split in which a network bearer between the radio terminal and a core network is split over first and second base stations. The communication control unit is configured to receive, from the first or second base station, first control information that relates to an access stratum and is necessary for the dual connectivity involving the bearer split, determine whether the bearer split is required based on the first control information, and control communication employing the dual connectivity in accordance with the first control information.

In an embodiment, a control method includes transmitting, from a first base station to a radio terminal, first control information that relates to an access stratum and is necessary for dual connectivity involving a bearer split in which a network bearer between the radio terminal and a core network is split over the first base station and a second base station.

In an embodiment, a control method that is performed by a radio terminal includes: (a) receiving, from a first or second base station, first control information that relates to an access stratum and is necessary for dual connectivity involving a bearer split in which a network bearer between the radio terminal and a core network is split over the first and second base stations; and (b) determining whether the bearer split is required based on the first control information, and controlling communication employing the dual connectivity in accordance with the first control information.

In an embodiment, a program includes instructions (software codes) for causing a computer to perform the above-described control method when the program is loaded into the computer.

Advantageous Effects of Invention

According to the embodiments described above, it is possible to provide a control procedure or signalling necessary for starting dual connectivity involving a bearer split.

DESCRIPTION OF EMBODIMENTS

Specific embodiments will hereinafter be described in detail with reference to the drawings. The same or corresponding elements are denoted by the same reference symbols throughout the drawings, and repeated descriptions thereof are omitted as appropriate for clarity of the explanation.

A plurality of embodiments below will mainly be described with reference to an Evolved Packet System (EPS). However, these embodiments are not limited to the EPS, and can be applied to other mobile communication networks or systems, such as a 3GPP Universal Mobile Telecommunications System (UMTS), a 3GPP2 CDMA2000 system (1×RTT, High Rate Packet Data (HRPD)), a global system for mobile communications (GSM)/General packet radio service (GPRS) system, and a WiMAX system.

First Embodiment

Figure 1A:
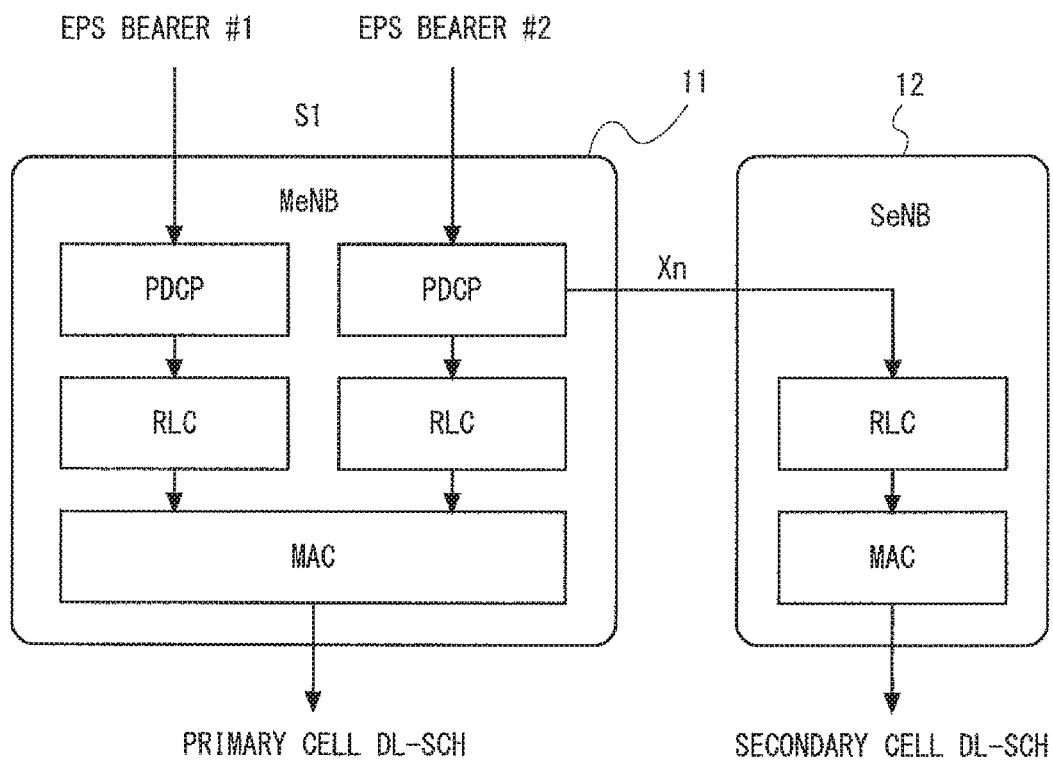
FIG. 1A is a diagram showing an example of a user plane protocol stack of LTE Layer-2 related to dual connectivity involving a bearer split.
Figure 1B:
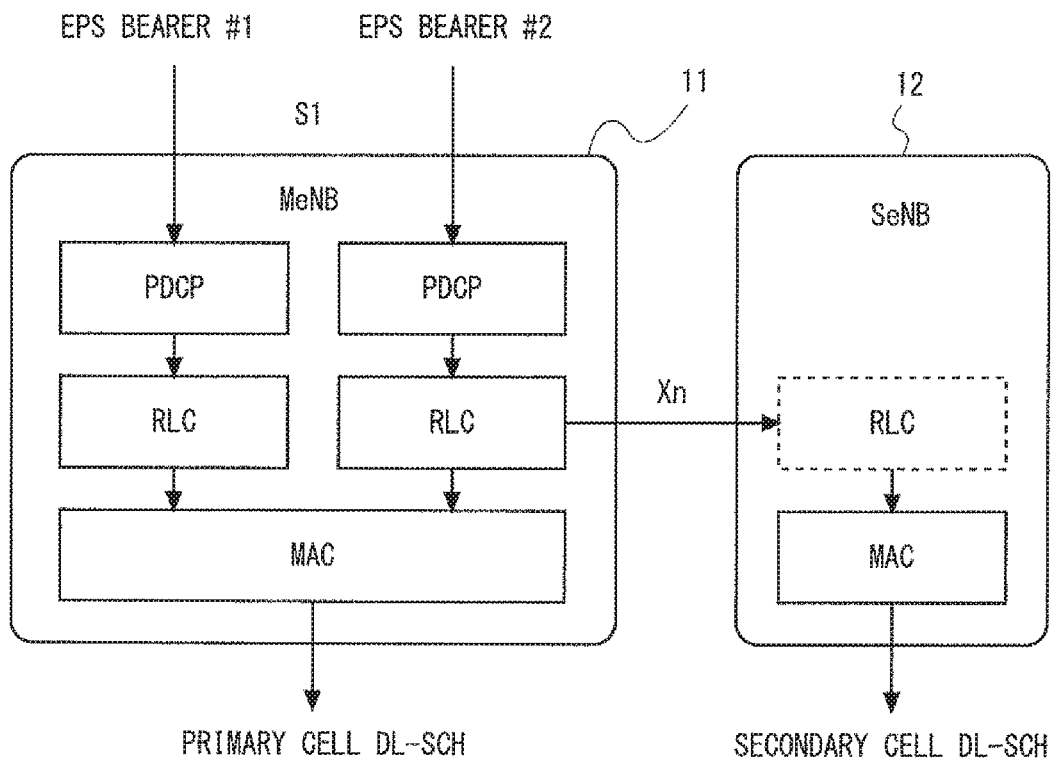
FIG. 1B is a diagram showing another example of the user plane protocol stack of LTE Layer-2 related to dual connectivity involving a bearer split.

First, with regard to some embodiments including this exemplary embodiment, several examples of dual connectivity involving a bearer split are described. FIGS. 1A and 1B show two alternatives of a user plane protocol stack of LTE Layer-2 related to dual connectivity (e.g., inter-node radio resource aggregation) involving a bearer split. In the bearer split, a network bearer (EPS bearer) configured between a UE and an endpoint (i.e., P-GW) of a core network (EPC) is split over an MeNB 11 and an SeNB 12. In the alternatives shown in FIGS. 1A and 1B, an EPS bearer #2 is split over the MeNB 11 and the SeNB 12. An EPS bearer #1 shown in FIGS. 1A and 1B is a normal bearer which is not subjected to a bearer split. Accordingly, the EPS bearer #1 is mapped in a one-to-one correspondence to the radio bearer in a cell of the MeNB 11.

In the alternatives shown in FIGS. 1A and 1B, one data radio bearer (DRB), which has a one-to-one association with the EPS bearer #2 is split over the MeNB 11 and the SeNB 12 in a Packet Data Convergence Protocol (PDCP) sublayer, a Radio Link Control (RLC) sublayer, or a MAC sublayer of Layer-2. Specifically, in the alternative shown in FIG. 1A, a PDCP entity of the MeNB 11 terminates the S1-U of the EPS bearer #2. In other words, one S1 bearer and one data radio bearer (DRB) which are mapped to the EPS bearer #2 are terminated at the PDCP sublayer of the MeNB 11. Further, in the alternative shown in FIG. 1A, the MeNB 11 and the SeNB 12 have independent RLC entities for bearer split, and one DRB (or PDCP bearer) terminated at the MeNB 11 is split over the RLC bearer of the MeNB 11 and the RLC bearer of the SeNB 12. Note that, the term "PDCP bearer" means a connection terminated at the PDCP sublayers of the eNB and the UE. The PDCP bearer can also be called a PDCP Protocol Data Unit (PDCP PDU). In the example shown in FIG. 1A, there is one PDCP bearer related to the EPS bearer #2 to be split, and this PDCP bearer is terminated at the MeNB 11 and the UE 2. On the other hand, the term "RLC bearer" means a connection terminated at the RLC sublayers of the eNB and the UE. The RLC bearer can also be called an RLC PDU or a logical channel. In the example shown in FIG. 1, there are two independent RLC bearers associated with the EPS bearer #2. One of the two RLC bearers is terminated at the MeNB 11 and the UE 2, and the other one is terminated at the SeNB 12 and the UE 2. Accordingly, in the architecture shown in FIG. 1A, the UE 2 is required to have two independent RLC entities associated with the EPS bearer #2 to be split.

Like in the alternative shown in FIG. 1A, in the alternative shown in FIG. 1B, a PDCP entity of the MeNB 11 terminates the S1-U of the EPS bearer #2. Further, as for the EPS bearer #2 to be split, the MeNB 11 has a master RLC entity and the SeNB 12 has a slave RLC entity. In the alternative shown in FIG. 1B, the UE 2 is required to have only one RLC entity associated with the EPS bearer #2 to be split. In the downlink, the slave RLC entity of the SeNB 12 receives, from the master RLC entity of the MeNB 11, RLC PDUs that has already been generated by the master RLC entity and allocated to the slave RLC for transmission.

The following description is based on an assumption that a cell of the MeNB 11 can be called a PCell and a cell of the SeNB 12 can be called an SCell from the viewpoint of the conventional Carrier Aggregation (CA). However, the scope of this embodiment is not limited to this. For example, when the radio terminal (UE) performs the CA (Intra-SeNB CA) on a plurality of cells of the SeNB 12 (i.e., at least a plurality of downlink Component Carriers (CCs)) during dual connectivity, one of the cells of the SeNB 12 subjected to the CA may be defined as a PCell or a pseudo PCell which functions similarly to a PCell. The pseudo PCell can also be called an Anchor cell, a Master cell, a Control cell, or the like. In the CA of the cells of the SeNB 12, the former cell (the PCell of the SeNB 12) has a role similar to that of the PCell in the conventional CA. In the PCell of the SeNB 12, for example, the eNB (SeNB) carries out SCell configuration or SCell activation/deactivation for the CA, and the UE carries out Radio Link Monitoring (RLM)/Radio Link Failure (RLF) detection. Further, the UE may perform, for example, transmission of L1/L2 control information (e.g., CQI, CSI, HARQ feedback, Scheduling Request) in an uplink control channel (PUCCH), transmission of (a preamble of) a Contention-based Random Access Channel (RACH), and reception of a response (Random Access Response (RAR)) to the RACH Preamble. The latter cell (the Pseudo PCell of the SeNB 12) has a role as a cell having a PCell function regarding the control of a User Plane (UP) in the conventional CA. In the Pseudo PCell of the SeNB 12, the UE may perform, for example, transmission of L1/L2 control information in the uplink control channel (PUCCH), transmission of (a preamble of) a Contention-based RACH, and reception of a response (RAR) to the RACH Preamble.

Furthermore, in the UE, the cells of the MeNB 11 and the cells of the SeNB 12 need not necessarily have a hierarchical relationship (PCell and SCell) or a master-slave relationship.

The user plane protocol stack for dual connectivity involving a bearer split is not limited to the alternatives shown in FIGS. 1A and 1B. In the bearer split, for example, two radio bearers may be mapped to one network bearer (EPS bearer). When the terms in FIGS. 1A and 1B are used, it can be expressed that the EPS bearer #2 is mapped to both the radio bearer (RB) in the cell (PCell) of the MeNB 11 and the radio bearer in the cell (SCell) of the SeNB 12. For convenience of explanation, the radio bearer in the cell (PCell) of the MeNB 11 is defined herein as a Primary RB (P-RB) and the radio bearer (RB) in the cell (SCell) of the SeNB is defined herein as a Secondary RB (S-RB). Since the bearer split is mainly applied to data radio bearers (DRBs), the P-RB and the S-RB can also be called P-DRB and S-DRB, respectively. For example, the MeNB 11 may terminate the S1-U of the EPS bearer #2, and the MeNB 11 and the SeNB 12 may have independent PDCP entities. Further, in a new layer higher than the PDCP entity of the MeNB 11, a downlink S1-U packet stream of the EPS bearer #2 may be split over the PDCP entity of the MeNB 11 and the PDCP entity of the SeNB 12. In this case, there are two independent PDCP bearers related to the EPS bearer #2. One of the two PDCP bearers is terminated at the MeNB 11 and the UE 2, and the other one is terminated at the SeNB 12 and the UE 2.

Figure 2:
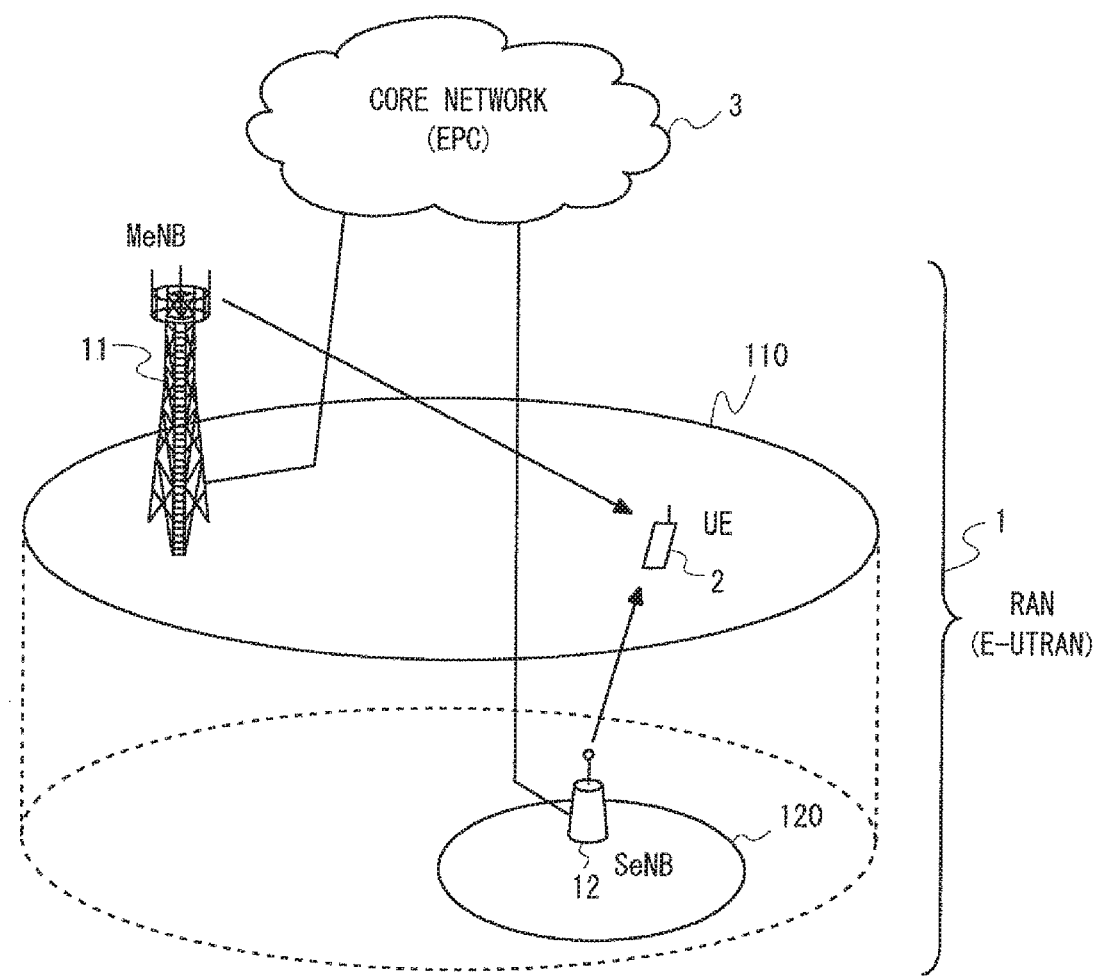
FIG. 2 is a diagram showing a configuration example of a radio communication system according to first to third embodiments.

FIG. 2 shows a configuration example of a radio communication system according to some embodiments including this embodiment. The radio communication system includes a radio access network (RAN) 1, a radio terminal (UE) 2, and a core network 3. In the EPS, the RAN 1 is an Evolved UMTS Terrestrial Radio Access Network (E-UTRAN), and the core network 3 is an Evolved Packet Core (EPC). The E-UTRAN 1 includes base stations (evolved NodeBs (eNBs)) 11 and 12. The eNB 11 manages a cell 110, and the eNB 12 manages a cell 120. The UE 2 is connected to the eNBs 11 and 12 by means of a radio access technology. The EPC 3 is accessed from the UE 2 through the E-UTRAN 1, and provides the UE 2 with a connection service (e.g., Internet Protocol (IP) connection service) for connecting to an external network (Packet Data Network (PDN)). In addition, FIG. 2 shows a HetNet environment. Specifically, the cell 110 shown in FIG. 2 has a coverage area larger than that of the cell 120. FIG. 2 also shows a hierarchical cell configuration in which the cell 120 is located within the cell 110. However, the cell configuration shown in FIG. 2 is merely an example. For example, the cells 110 and 120 may have the same degree of coverage. In other words, the radio communication system according to this embodiment may be applied to a homogeneous network environment.

The E-UTRAN 1 and the UE 2 according to this embodiment support dual connectivity involving a bearer split. Specifically, while using the cell 110 of the eNB (i.e., MeNB) 11 as a primary cell (PCell), the UE 2 can use the cell 120 of the eNB (i.e., SeNB) 12 as a secondary cell (SCell). The UE 2 can receive and/or transmit data of one EPS bearer subjected to a bearer split through the PCell 110 and the SCell 120.

To start dual connectivity involving a bearer split, the E-UTRAN 1 and the UE 2 according to this embodiment carry out a control procedure or signalling as described below. The E-UTRAN 1 is configured to transmit, to the UE 2, first control information that relates to an access stratum and is necessary for dual connectivity involving a bearer split. The UE 2 is configured to receive the first control information from the E-UTRAN 1, determine whether the bearer split is required based on the first control information (i.e., based on the decoding result of the first control information), and control communication employing the dual connectivity involving the bearer split in accordance with the first control information. In order to determine whether the bearer split is required based on the first control information, the UE 2 may consider, for example, whether configuration information related to the bearer split is included or not, whether an explicit indication (e.g., a flag) to instruct performing the bearer split is included or not, or whether radio resource control information necessary for execution of the bearer split is included or not. The first control information relating to the access stratum to be transmitted from the E-UTRAN 1 to the UE 2 may include at least one of the following information items (1) to (5):

(1) Radio bearer (RB) configuration information about P-RB and S-RB;
(2) Control information about Scheduling Request (SR);
(3) Control information about uplink (UL) transmission power control;
(4) Control information about generation of uplink (UL) MAC PDUs; and
(5) Control information about a terminal measurement report (UE measurement report).

(1) RB Configuration Information about P-RB and S-RB

The information items (1) to (5) will be sequentially described below. The RB configuration information about the P-RB and the S-RB indicates mapping of the two RBs (i.e., P-RB and S-RB) in the PCell 110 and the SCell 120 to one EPS bearer. This RB configuration information is effective in the architecture in which one EPS bearer is mapped to both the P-RB in the PCell 110 and the S-RB in the SCell 120. The RB configuration information about the P-RB and the S-RB may indicate that an EPS bearer identity in common with the P-RB is also set to the S-RB. For example, the RB configuration information may indicate that the EPS bearer identity associated with the EPS Radio Bearer identity (or DRB-identity) of the P-RB is also associated with the EPS Radio Bearer identity (or DRB-identity) of the S-RB. Alternatively, the RB configuration information may indicate that the EPS bearer identity and the EPS Radio Bearer identity (or DRB-identity) which are the same as those of the P-RB are set to the S-RB.

The differences between the RB configuration information about the P-RB and the S-RB and the SCell configuration information in the normal CA (intra-eNB CA) will now be described. In the normal CA (intra-eNB CA), the eNB transmits the SCell configuration to the UE through the PCell, and the UE executes the SCell configuration. The SCell configuration in the normal CA includes dedicated (per-UE) radio resource configuration information for SCell (RadioResourceConfigDedicatedSCell). The configuration information in the normal CA includes SCell physical channel configuration information, but does not include any information about the radio bearer (RB). This is because the unique functions necessary for the SCell in the normal CA are only the functions of a PHY layer and a MAC sublayer (i.e., the RLC sublayer and the PDCP sublayer of the SCell are in common with those of the PCell), and accordingly, the radio bearer configuration of the SCell (i.e., mapping between the EPS bearer and the radio bearer) is unnecessary.

On the other hand, the architecture in which one EPS bearer is mapped to both the P-RB in the PCell 110 and the S-RB in the SCell 120 requires information indicating that one EPS bearer is mapped to radio bearers of different eNBs (MeNB 11 and SeNB 12). In other words, since the SCell configuration method employed in the normal CA (intra-eNB CA) lacks a radio bearer configuration procedure for the SCell, it is difficult to apply the SCell configuration method in the normal CA to the SCell configuration in the architecture in which one EPS bearer is mapped to both the P-RB in the PCell 110 and the S-RB in the SCell 120. Accordingly, as described herein, new RB configuration information different from that of the normal CA is required. Note that, the new RB configuration information is configuration information especially about the S-RB and thus can also be called S-RB configuration information.

(2) Control Information about SR

When there is data to be transmitted to the UE 2, a Scheduling Request (SR) is transmitted from the UE to an eNB to request allocation of an uplink radio resource. The UE transmits the SR in a Physical Uplink Control Channel (PUCCH), or by using a Random Access Procedure using a Random Access Channel (RACH). When data for transmission of the EPS Bearer subjected to a bearer split is available in the UE 2, control information about the SR indicates either a cell (e.g., the PCell 110) of the MeNB 11 or a cell (e.g., the SCell 120) of the SeNB 12 to which the SR is to be transmitted. For example, the control information about the SR may explicitly indicate one of the MeNB 11 (PCell 110) and the SeNB 12 (SCell 120) to which the SR (or an RACH for transmitting the SR) is to be transmitted. Alternatively, the control information about the SR may indicate that the UE 2 is allowed to select the destination of the SR (or an RACH for transmitting the SR). Specifically, the control information about the SR may specify signalling which enables selection of the destination of the SR (or an RACH for transmitting the SR), or may instruct the UE 2 to select the destination of the SR. Through this control, the UE 2 can appropriately determine the destination of the SR even during execution of the bearer split.

(3) Control Information about UL Transmission Power Control

During execution of the bearer split, an upper limit of total transmission power for uplink transmission in a cell (e.g., the PCell 110) of the MeNB 11 and a cell (e.g., the SCell 120) of the SeNB 12 may be specified. The control information about UL transmission power control may be applied to the procedure for controlling uplink transmission power in the UE 2 when the UE 2 is scheduled for uplink transmission in the PCell 110 and uplink transmission in the SCell 120 in the same subframe (LTE subframe) (i.e., when the UE 2 receives UL grants for both the PCell 110 and the SCell 120). Alternatively, the control information about UL transmission power control may be applied to the procedure for controlling uplink transmission power in the UE 2 when data or control information to be transmitted in the uplink is available in both the PCell 110 and the SCell 120. The control information may indicate, for example, maximum transmission power applied to the total transmission power for uplink transmission in the PCell 110 and the SCell 120. The UE 2 may first determine the transmission power in the PCell 110 and then determine the transmission power in the SCell 120. In other words, the UE 2 may perform uplink transmission in the SCell 120 by using surplus transmission power that is not used for uplink transmission in the PCell 110. Alternatively, the UE 2 may perform uplink transmission in the PCell 110 by using surplus transmission power that is not used for uplink transmission in the SCell 120. Through this control, the UE 2 can appropriately perform the UL transmission power control even during execution of the bearer split.

Alternatively, during execution of the bearer split, an upper limit of transmission power may be specified for each of uplink transmission in the PCell 110 and uplink transmission in the SCell 120. In this case, the control information about UL transmission power control may indicate first and second maximum transmission power applied to uplink transmission in the PCell 110 and uplink transmission in the SCell 120, respectively. The control information may indicate a configuration value of the first maximum transmission power, and an offset value (a positive or negative value) for obtaining the second maximum transmission power. A value obtained by adding the offset value to the configuration value of the first maximum transmission power may be used as the second maximum transmission power applied to uplink transmission in the SCell 120. Through this control, the UE 2 can appropriately perform the UL transmission power control even during execution of the bearer split.

(4) Control Information about Generation of UL MAC PDUs

Even during execution of the bearer split, the UE 2 should generate MAC PDUs in consideration of an EPS bearer QoS (QoS class identifier (QCI), a guaranteed bit rate (GBR), an aggregate maximum bit rate (AMBR), etc.) for each of all EPS bearers including bearers which are subjected to a bearer split and bearers which are not subjected to a bearer split. One MAC PDU can also be called a transport block. Accordingly, the control information about generation of UL MAC PDUs is applied to the procedure for generating a first MAC PDU for uplink transmission in the PCell 110 and a second MAC PDU for uplink transmission in the SCell 120 in the UE 2, when the UE 2 is scheduled for uplink transmission in the cell (e.g., the PCell 110) of the MeNB 11 and uplink transmission in the cell (e.g., the SCell 120) of the SeNB 12 in the same subframe (LTE subframe).

The control information about generation of UL MAC PDUs may indicate, for example, a first Prioritized Bit Rate (PBR) applied to generation of the first MAC PDU and a second PBR applied to generation of the second MAC PDU for one logical cannel of the EPS bearer subjected to the bearer split. In other words, the information may specify two PBRs, i.e., the first PBR for transmission in the PCell 110 and the second PBR for transmission in the SCell 120, for one logical channel of the EPS bearer subjected to the bearer split. In this case, the first and second PBRs may be configured so that the total (arithmetic sum) of the first and second PBRs becomes a PBR appropriate for one logical channel of the EPS bearer subjected to the bearer split. This control can prevent transmission of an excessive amount of uplink data of the EPS bearer subjected to the bearer split (i.e., prevent an excessive amount of uplink data of the EPS bearer subjected to the bearer split from being included in the MAC PDU), as compared with the uplink data of EPS bearers which are not subjected to the bearer split.

The control information about the generation of the UL MAC PDU may indicate either the first MAC PDU or the second MAC PDU for which the Prioritized Bit Rate (PBR) applied to the logical channel of the EPS bearer subjected to the bearer split is should be preferentially secured. It may be desirable for the UE 2 to preferentially use the uplink resources allowed in the PCell 110 for transmission of EPS bearers which are not subjected to the bearer split. This is because uplink transmission of the EPS bearer subjected to the bearer split can use the uplink resources allowed in the SCell 120. Accordingly, the control information about generation of UL MAC PDUs may indicate that the PBR applied to the logical channel of the EPS bearer subjected to the bearer split should be preferentially secured for the second MAC PDU. This control can suppress transmission of an excessive amount of uplink data of the EPS bearer subjected to the bearer split, as compared with uplink data of EPS bearers which are not subjected to the bearer split.

The control information about generation of UL MAC PDUs may include a configuration value (weighting factor) used for weighting a PBR applied to the PCell 110 (first MAC PDU) and a PBR applied to the SCell 120 (second MAC PDU) during execution of the bearer split. Further, the control information may include a configuration value (weighting factor) for weighting a PBR applied to the logical channel of the EPS bearer subjected to the bearer split and a PBR applied to a logical channel of an EPS bearer which is not subjected to the bearer split.

(5) Control Information about a Terminal Measurement Report (UE Measurement Report)

LTE specifies the following events that trigger a terminal measurement report (UE Measurement Report).

Event A1 (Serving becomes better than threshold)
Event A2 (Serving becomes worse than threshold)
Event A3 (Neighbour becomes offset better than PCell)
Event A4 (Neighbour becomes better than threshold)
Event A5 (PCell becomes worse than threshold1 and neighbour becomes better than threshold2)
Event A6 (Neighbour becomes offset better than SCell)

The term "Serving (cell)" represents each cell configured and activated by a network (i.e., eNB) so that the UE 2 can use the cell for data communication. For example, when the UE 2 uses two cells in the conventional CA, each of the two cells is a serving cell, and the cell of interest (i.e., the serving cell to be compared) may be determined depending on the cell in which the measurement report configuration is performed. That is, the cell to which the configuration is transmitted (the cell in which the UE 2 receives the configuration) may be considered as the serving cell. On the other hand, the term "neighbour (cell)" is basically a cell other than the serving cell. However, in Events A3 and A5, a serving cell other than the serving cell of interest (i.e., a comparison reference) may also be considered as one of the neighbor cells.

The control information about the terminal measurement report may indicate any one or more of the above-mentioned events, or may indicate an event newly defined for the bearer split. When the control information indicates any one or more of the above-mentioned events, the PCell may be the cell 110 of the MeNB 11 or the cell 120 of the SeNB 12. Further, the SCell(s) may be a cell(s) other than the cell 110 of the MeNB 11 (if the cell(s) is configured), the cell 120 of the SeNB 12, or a cell(s) other than the cell 120 of the SeNB 12 (if the cell(s) is configured). Examples of the new event may include the following events A7-A10 (the numbers assigned to the events are only illustrative and are not limited thereto):

Event A7 (Neighbour becomes offset better than Pseudo PCell);
Event A8 (Pseudo PCell becomes worse than threshold) and neighbour becomes better than threshold2);
Event A9 (Neighbour of SeNB becomes better than threshold); and
Event A10 (Neighbour of SeNB becomes offset better than SCell).

Figure 3:
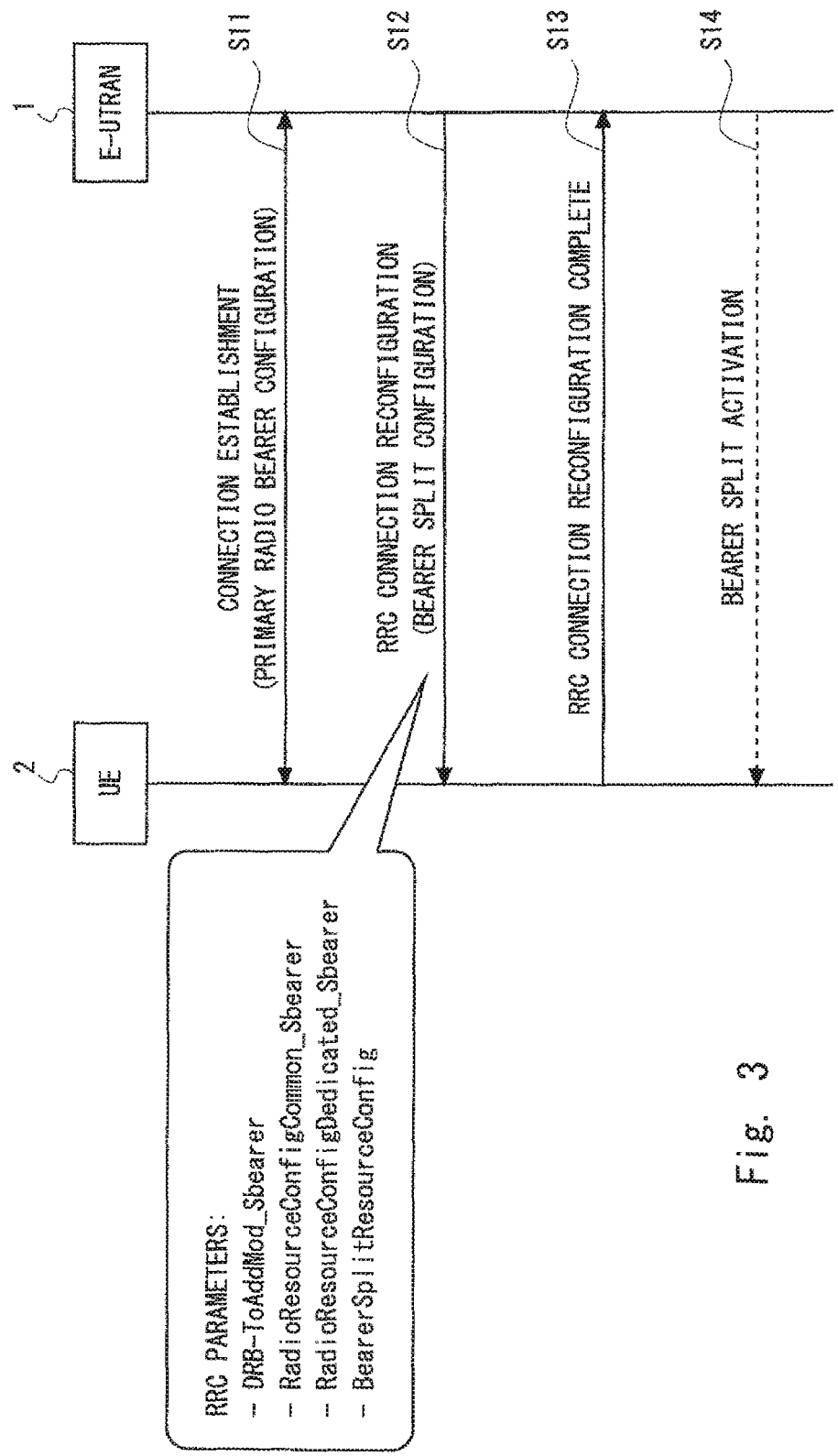
FIG. 3 is a sequence diagram showing an example of a control procedure for starting dual connectivity involving a bearer split according to the first embodiment.

Next, several examples of the control procedure for starting dual connectivity (e.g., inter-node radio resource aggregation) involving a bearer split are described. FIG. 3 is a sequence diagram showing an example of the control procedure for starting dual connectivity involving a bearer split. In the example shown in FIG. 3, dual connectivity involving a bearer split is configured during a procedure in which the UE 2 transitions from an RRC_IDLE state to an RRC_CONNECTED state to start a service (e.g., FTP download). Upon determining that a bearer split is necessary (or effective) for the UE 2, the E-UTRAN 1 initiates configuration of the bearer split. Further, in the example shown in FIG. 3, one EPS Bearer is mapped to both the Primary RB (P-RB) in the PCell 110 and the Secondary RB (S-RB) in the SCell 120. In the example shown in FIG. 3, the UE 2 first establishes the P-RB in the PCell 110, and then establishes the S-RB in the SCell 120.

In step S11, the UE 2 executes a Connection Establishment procedure with the E-UTRAN 1. In the Connection Establishment procedure of step S11, an RRC connection is first established between the MeNB 11 and the UE 2 (step 1), and then initial security activation and establishment of a DRB (i.e., P-RB) are carried out (step 2). Step 1 includes transmission of an RRC Connection Request message from the UE 2 to the MeNB 11, transmission of an RRC Connection Setup message from the MeNB 11 to the UE 2, and transmission of an RRC Connection Setup Complete message from the UE 2 to the MeNB 11. Step 2 includes transmission of an RRC Connection Reconfiguration message from the MeNB 11 to the UE 2, and transmission of an RRC Connection Reconfiguration Complete message from the UE 2 to the MeNB 11. The configuration information about the P-RB is included in the RRC Connection Reconfiguration message in step 2.

In step S12, the E-UTRAN 1 transmits an S-RB configuration (Bearer Split Configuration) to the UE 2. The S-RB configuration may be transmitted by the MeNB 11, or by a combination of the MeNB 11 and the SeNB 12. In other words, a part of the S-RB configuration may be transmitted from the MeNB 11 to the UE 2, and the rest of the S-RB configuration may be transmitted from the SeNB 12 to the UE 2. The S-RB configuration may be transmitted using an RRC Connection Reconfiguration message as shown in FIG. 3.

In step S13, the UE 2 reports completion of the S-RB configuration to the E-UTRAN 1. The UE 2 may report the completion of the S-RB configuration to the MeNB 11 or the SeNB 12, or to both of them. The completion of the S-RB configuration may be transmitted using an RRC Connection Reconfiguration Complete message as shown in FIG. 3.

In step S14, the E-UTRAN 1 notifies the UE 2 about the start of using the S-RB (Bearer Split Activation). The notification of the start of using the S-RB may be transmitted from the MeNB 11 or the SeNB 12. Note that step S14 may be omitted. In this case, the use of the S-RB may be started upon completion of step S13.

The S-RB configuration (Bearer Split Configuration) transmitted from the E-UTRAN 1 to the UE 2 in step S12 of FIG. 3 corresponds to the first control information relating to an access stratum described above. The S-RB configuration (Bearer Split Configuration) is a generic term (logical term) for configuration elements included in the following four messages:

DRB-ToAddMod Sbearer;
RadioResourceConfigCommon Sbearer;
RadioResourceConfigDedicated Sbearer; and
BearerSplitResourceConfig.

These configuration elements may be transmitted to the UE 2 as one information element (IE) or as a plurality of information elements (IEs).

DRB-ToAddMod Sbearer indicates the S-RB configuration (e.g., eps-BearerIdentity, drb-Identity, pdcp-Config, and rlc-Config). As described above, eps-BearerIdentity and drb-Identity of the S-RB may be the same as eps-BearerIdentity and drb-Identity of the P-RB. However, drb-Identity of the P-RB may be different from that of the P-RB.

RadioResourceConfigCommon Sbearer indicates a resource configuration (e.g., prach-Config, pdsch-ConfigCommon, pusch-ConfigCommon, pucch-ConfigCommon, uplinkPowerControlCommon, and tdd-Config, dl-Bandwidth) of the S-RB. In other words, RadioResourceConfigCommon Sbearer includes common radio resource information about the cell in which the S-RB is configured (established).

RadioResourceConfigDedicated Sbearer indicates a resource configuration (e.g., physicalConfigDedicated and mac-MainConfig) of the S-RB. In other words, RadioResourceConfigDedicated Sbearer includes dedicated radio resource information about the cell in which the S-RB is configured (established). The above-mentioned DRB-ToAddMod Sbearer may be transmitted as one element contained in this IE.

BearerSplitResourceConfig indicates specific configurations of the bearer split. The specific configuration of the bearer split includes control parameters related to functions used during execution of the bearer split. These control parameters can be used for configuring functions that require a configuration for the bearer split different from that when no bearer split is executed, or for configuring a new (special) function that is used only during execution of the bearer split. As described above, these control parameters may include at least one of: (a) control information about a scheduling request (SR) and a random access channel (RACH); (b) control information about UL transmission power control (UL power control); and (c) control information about generation of UL MAC PDUs (e.g., control information about logical channel prioritization (LCP)).

Figure 4:
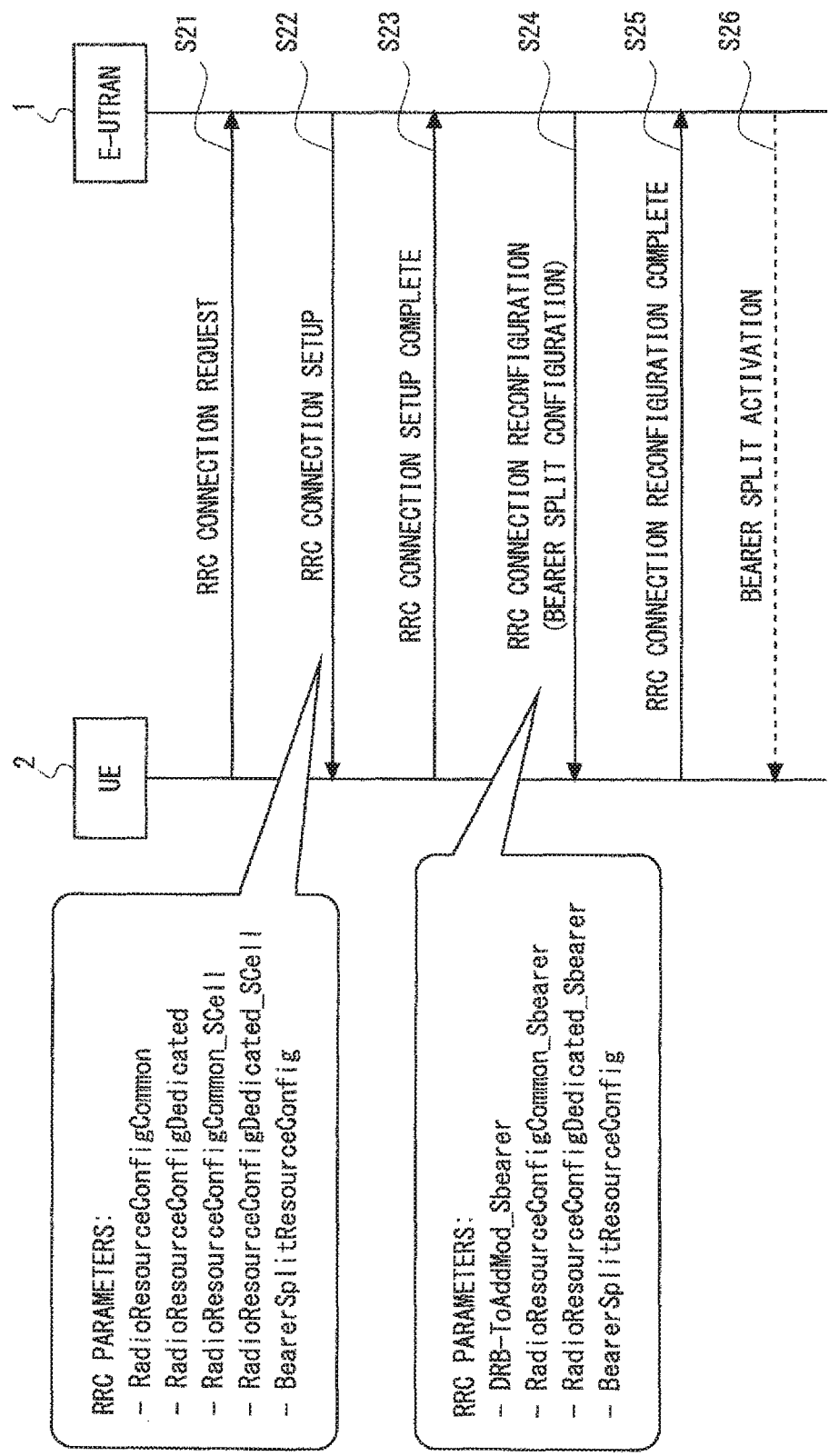
FIG. 4 is a sequence diagram showing another example of the control procedure for starting dual connectivity involving a bearer split according to the first embodiment.

FIG. 4 is a sequence diagram showing another example of the control procedure for starting dual connectivity involving a bearer split. The example shown in FIG. 4 is different from the example shown in FIG. 3 in that the P-RB and the S-RB are simultaneously configured during the procedure in which the UE 2 transitions from the RRC_IDLE state to the RRC_CONNECTED state.

In steps S21 to S25, the UE 2 executes a Connection Establishment procedure with the E-UTRAN 1. That is, steps S21 to S25 correspond to step S11 shown in FIG. 3. Steps S21 to S23 correspond to an RRC connection establishment procedure (step 1), and steps S24 and S25 correspond to a DRB establishment procedure (step 2).

In step S21, the UE 2 transmits an RRC Connection Request message to the E-UTRAN 1. In step S22, the E-UTRAN 1 transmits an RRC Connection Setup message to the UE 2. This RRC Connection Setup message contains both a configuration of the PCell 110 and a configuration of the SCell 120. In step S23, the UE 2 transmits an RRC Connection Setup Complete message to the E-UTRAN 1. This RRC Connection Setup Complete message indicates the completion of the configuration of the PCell 110 and the SCell 120.

In step S24, the E-UTRAN 1 transmits an RRC Connection Reconfiguration message to the UE 2 to establish DRBs (i.e., both the P-RB and the S-RB). This RRC Connection Reconfiguration message contains both a configuration of the P-RB and a configuration of the S-RB. In step S25, the UE 2 transmits an RRC Connection Reconfiguration Complete message to the E-UTRAN 1. This RRC Connection Reconfiguration Complete message indicates the completion of the configuration of the P-RB and the S-RB.

In step S25, the E-UTRAN 1 notifies the UE 2 about the start of using the S-RB (Bearer Split Activation). Similar to step S14 shown in FIG. 3, step S25 may be omitted.

In the procedure shown in FIG. 4, a part (e.g., BearerSplitResourceConfig) of the SCell configuration may be transmitted in step S24 instead of step S22.

The processing by the E-UTRAN 1 in the procedure shown in FIG. 4 may be performed by the MeNB 11, or may be performed by a combination of the MeNB 11 and the SeNB 12.

FIGS. 3 and 4 show examples of the control or signalling for starting dual connectivity involving a bearer split is carried out when the UE 2 transitions from the RRC_IDLE state to the RRC_CONNECTED state. However, the control or signalling for starting dual connectivity involving a bearer split may be carried out when the UE 2 is already in the RRC_CONNECTED state in the PCell 110 and is in the ECM-CONNECTED state with the EPC 3 and when the UE 2 is receiving a service from the EPC 3 through the PCell 110 (i.e., when the EPS Bearer is already configured).

As can be understood from the above description, according to this embodiment, it is possible to provide a control procedure or signalling necessary for starting dual connectivity involving a bearer split.

Second Embodiment

In this embodiment, a modification of the first embodiment is described. A configuration example of a radio communication system according to this embodiment is similar to that shown in FIG. 2. In this embodiment, the MeNB 11 exchanges signalling messages with the SeNB 12 through an inter-base-station interface (e.g., Xn interface), and applies a configuration of dual connectivity (e.g., inter-node radio resource aggregation) involving a bearer split to the SeNB 12. For example, the MeNB 11 may send, to the SeNB 12, second control information necessary for starting dual connectivity involving a bearer split (i.e., configuration information of the bearer split). At this time, the SeNB 12 may determine whether the second control information (bearer split configuration information) received from the MeNB 11 is acceptable. If the second control information is not acceptable, the SeNB 12 may notify the MeNB 11 that the second control information is not acceptable, or may suggest an acceptable alternative configuration to the MeNB 11. At least a part of the content of the second control information (configuration information of the bearer split) may be the same as a part of the content of the first control information described above. The MeNB 11 and the SeNB 12 may exchange signalling messages through an X2 interface or an S1 interface, instead of using the Xn interface.

Figure 5:
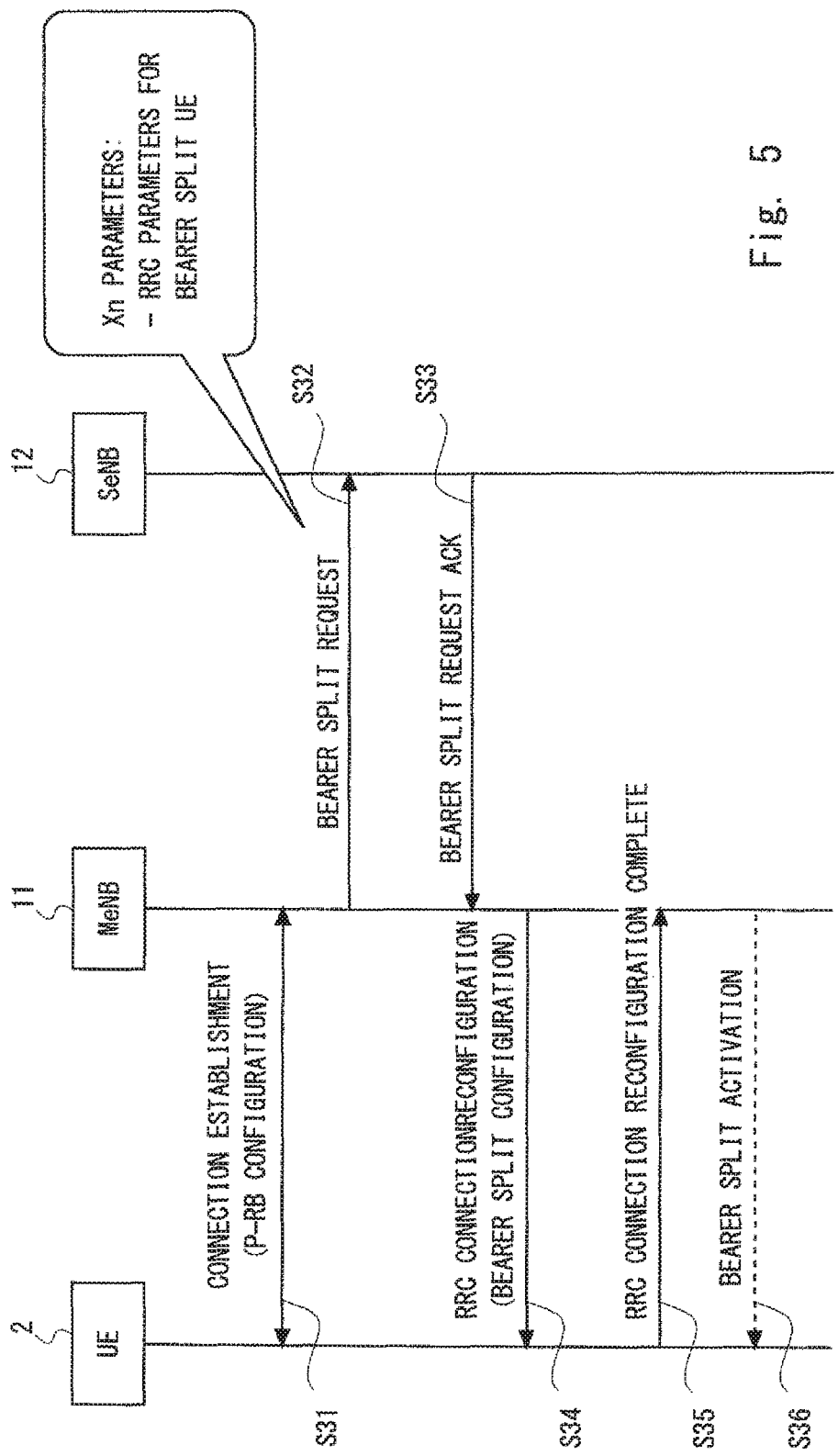
FIG. 5 is a sequence diagram showing an example of the control procedure for starting dual connectivity involving a bearer split according to the second embodiment.

FIG. 5 is a sequence diagram showing an example of the control procedure for starting dual connectivity involving a bearer split in this embodiment. Like in the example shown in FIG. 3, in the example shown in FIG. 5, dual connectivity involving a bearer split is configured during the procedure in which the UE 2 transitions from the RRC_IDLE state to the RRC_CONNECTED state to start a service (e.g., FTP download). Upon determining that a bearer split is necessary (or effective) for the UE 2, the MeNB 11 initiates configuration of the bearer split. Like in the example shown in FIG. 3, in the example shown in FIG. 5, one EPS Bearer is mapped to both the Primary RB (P-RB) in the PCell 110 and the secondary RB (S-RB) in the SCell 120. Like in the example shown in FIG. 3, in the example shown in FIG. 5, the UE 2 first establishes the P-RB in the PCell 110, and then establishes the S-RB in the SCell 120.

The processing of step S31 may be performed between the MeNB 11 and the UE 2 in the same manner as the processing of step S11 shown in FIG. 3. In step S32 of FIG. 5, the MeNB 11 sends a request for (execution or configuration of) a bearer split to the SeNB 12. In step S33, the SeNB 12 sends, to the MeNB 11, a response as to whether the (execution or configuration of) bearer split is accepted or not. If the (execution or configuration of) bearer split is accepted in the SeNB 12, the processing of steps S34 to S36 is carried out. The processing of steps S34 to S36 may be performed between the MeNB 11 and the UE 2 in the same manner as the processing of steps S12 to S14 shown in FIG. 3.

The configuration information of the bearer split may also be sent when the request for the bearer split is sent from the MeNB 11 to the SeNB 12 in step S32 shown in FIG. 5. The configuration information of the bearer split indicates, for example, mapping between the S-RB and the EPS bearer subjected to the bearer split. The configuration information of the bearer split may include the EPS bearer identity of the EPS bearer subjected to the bearer split and the Radio Bearer identity (DRB-identity) of the S-RB. Alternatively, the configuration information of the bearer split may include the EPS bearer identity of the EPS bearer, and may not include the Radio Bearer identity (DRB-identity) of the S-RB. In this case, the SeNB 12 may determine the Radio Bearer identity (DRB-identity) of the S-RB, and may notify the MeNB 11 of the determined Radio Bearer identity (DRB-identity) of the S-RB in step S33.

The configuration information of the bearer split, which is sent from the MeNB 11 to the SeNB 12 in step S32 shown in FIG. 5, may include at least one of the following information items, which are transmitted in step S12 shown in FIG. 3 (and step S34 shown in FIG. 5):

DRB-ToAddMod Sbearer;
Identification information about a cell of the SeNB subjected to a bearer split (e.g., ECGI and/or PCI);
RadioResourceConfigCommon Sbearer;
RadioResourceConfigDedicated Sbearer; and
BearerSplitResourceConfig.

In addition to or in place of these information items, the configuration information of the bearer split may include at least one of:

Identification information of the UE 2 (e.g., C-RNTI and/or TMSI);
Information about security; and
Information about radio resource use.

Examples of the information about security includes $K_{eNB}$, $K_{eNB}*$, NextHopChainingCount, and SecurityAlgorithmConfig. However, the information about security may include other security information of an access stratum (AS) layer. Examples of the information about radio resource use include a request for reporting the use status (Resource Status) of resources in the SeNB 12, and/or the cycle of the report.

As can be understood from the above description, according to this embodiment, it is possible to provide a control procedure or signalling between the MeNB 11 and the SeNB 12 that is necessary for starting dual connectivity involving a bearer split.

Third Embodiment

In this embodiment, a modification of the first and second embodiments is described. A configuration example of a radio communication system according to this embodiment is similar to that shown in FIG. 2. Like in the second embodiment, the MeNB 11 according to this embodiment exchanges signalling messages with the SeNB 12 through an inter-base-station interface (e.g., Xn interface), and applies a configuration of dual connectivity involving a bearer split to the SeNB 12.

Figure 6:
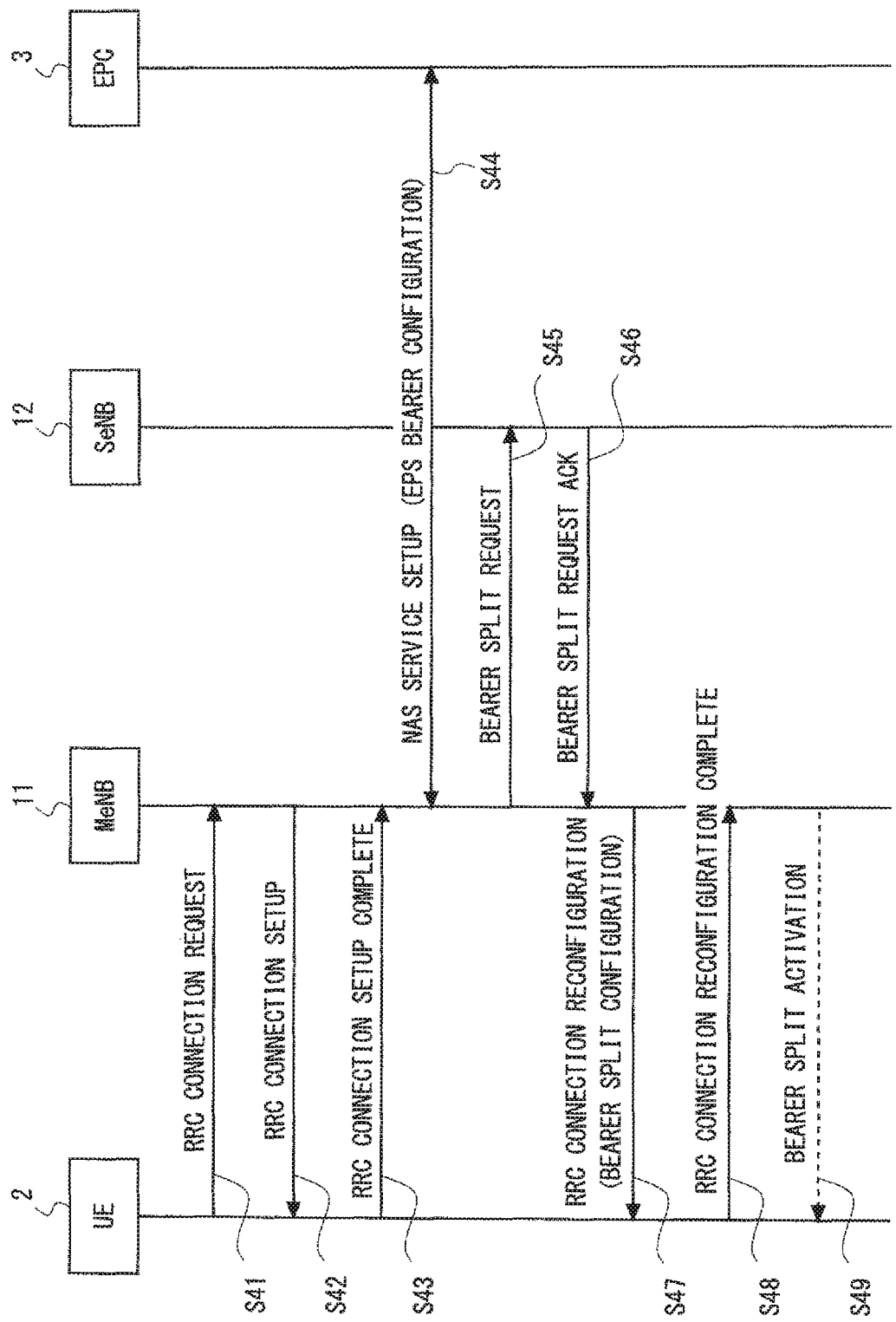
FIG. 6 is a sequence diagram showing an example of the control procedure for starting dual connectivity involving a bearer split according to the third embodiment.

FIG. 6 is a sequence diagram showing an example of the control procedure for starting dual connectivity involving a bearer split in this embodiment. Like in the example shown in FIG. 4, in the example shown in FIG. 6, the P-RB and the S-RB are simultaneously configured during the procedure in which the UE 2 transitions from the RRC_IDLE state to the RRC_CONNECTED state.

The processing of steps S41 to S43 may be performed between the MeNB 11 and the UE 2 in the same manner as the processing of steps S21 to S23 shown in FIG. 4. In step S44 shown in FIG. 6, the MeNB 11 performs NAS Service Setup with the EPC 3, and configures the EPS Bearer (NAS connection establishment). At this time, the MeNB 11 may send a request for a bearer split, a notification to perform a bearer split, or the like to the EPC 3 (specifically, MME).

The processing of steps S45 and S46 may be performed between the MeNB 11 and the SeNB 12 in the same manner as the processing of steps S32 and S33 shown in FIG. 5. Specifically, in step S45, the MeNB 11 requests the SeNB 12 to execute (configure) a bearer split. In step S46, the SeNB 12 sends, to the MeNB 11, a response as to whether the execution (configuration) of a bearer split is accepted or not.

The processing of steps S47 to S49 may be performed between the MeNB 11 and the UE 2 in the same manner as the processing of steps S24 to S26 shown in FIG. 4. If the execution (configuration) of a bearer split is accepted in the SeNB 12 in the procedure of steps S45 and S46, the MeNB 11 transmits to the UE 2 an RRC Connection Reconfiguration message containing both the P-RB configuration and the S-RB configuration in step S47. On the other hand, if the execution (configuration) of a bearer split is denied in the SeNB 12, in step S47, the MeNB 11 transmits to the UE 2 an RRC Connection Reconfiguration message which contains the P-RB configuration and does not contain the S-RB configuration.

As can be understood from the above description, according to this embodiment, it is possible to provide a control procedure or signalling between the MeNB 11 and the SeNB 12 that is necessary for starting dual connectivity involving a bearer split.

Figure 7:
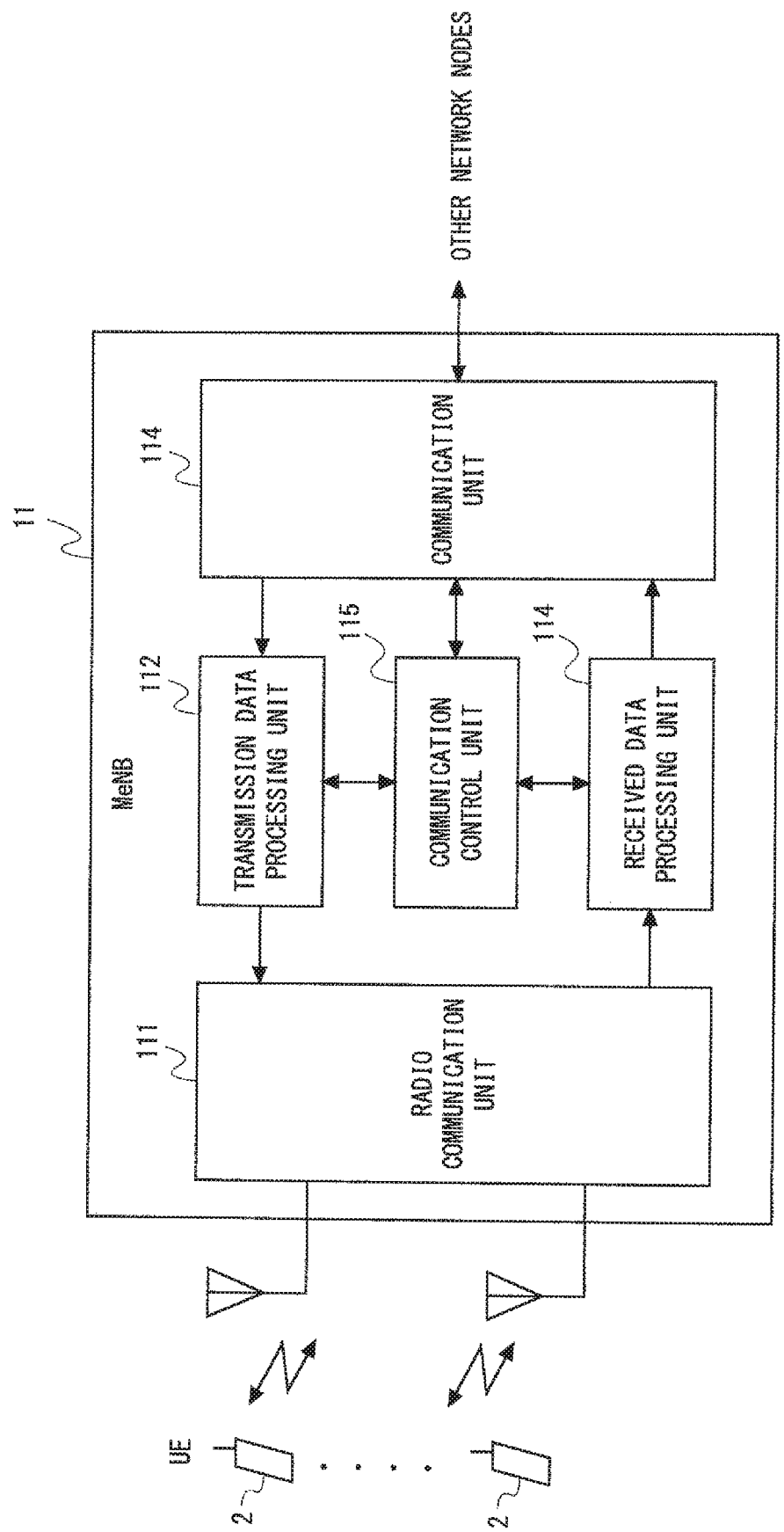
FIG. 7 is a block diagram showing a configuration example of an MeNB according to the first to third embodiments.

Next, configuration examples of the MeNB 11, the SeNB 12, and the UE 2 according to the first to third embodiments are described. FIG. 7 is a block diagram showing a configuration example of the MeNB 11. A radio communication unit 111 receives an uplink signal transmitted from the UE 2 via an antenna. A received data processing unit 113 recovers the received uplink signal. Obtained received data is transferred to other network nodes, such as Serving Gateway (S-GW) or MME of the EPC 3, or another eNB, via a communication unit 114. For example, uplink user data received from the UE 2 is transferred to the S-GW within the EPC 3. NAS control data contained in control data received from the UE 2 is transferred to the MME within the EPC 3. Further, the received data processing unit 113 receives control data to be sent to the SeNB 12 from a communication control unit 115, and sends the received control data to the SeNB 12 via the communication unit 114.

A transmission data processing unit 112 receives user data addressed to the UE 2 from the communication unit 114, and performs error correction coding, rate matching, interleaving, or the like, to thereby generate a transport channel. Further, the transmission data processing unit 112 adds control information to a data sequence of the transport channel, to thereby generate a transmission symbol sequence. The radio communication unit 111 generates a downlink signal by performing processing including carrier wave modulation based on the transmission symbol sequence, frequency conversion, and signal amplification, and transmits the generated downlink signal to the UE 2. The transmission data processing unit 112 receives control data to be transmitted to the UE 2 from the communication control unit 115, and transmits the received control data to the UE 2 via the radio communication unit 111.

The communication control unit 115 controls dual connectivity involving a bearer split. The communication control unit 115 is configured to transmit, the first control information, which relates to the access stratum and is necessary for dual connectivity involving a bearer split, to the UE 2 via the transmission data processing unit 112 and the radio communication unit 111. In the second and third embodiments, the communication control unit 115 is configured to send the radio bearer (RB) configuration information, which indicates mapping between the S-RB and the EPS bearer subjected to the bearer split, to the SeNB 12 via the communication unit 114.

Figure 8:
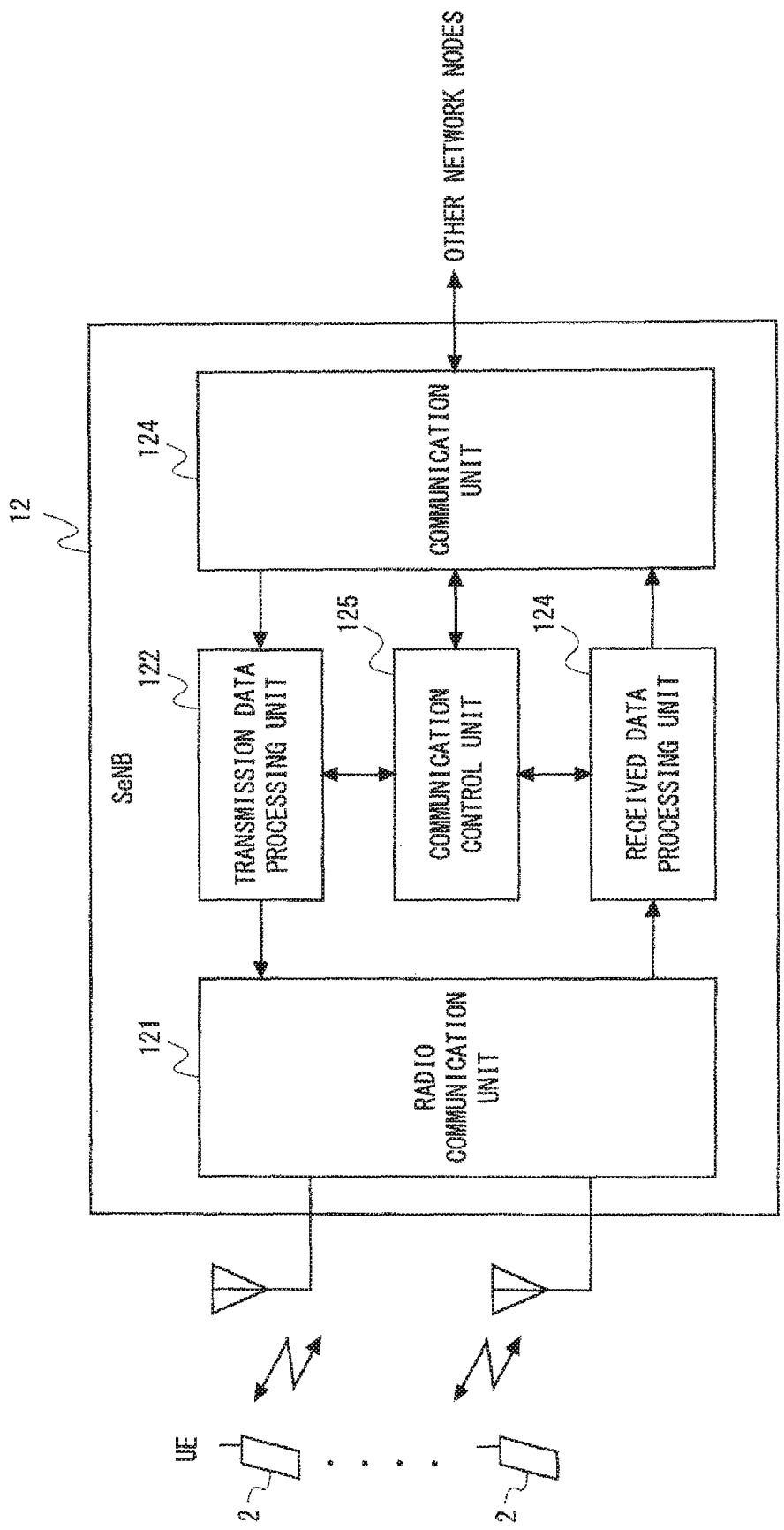
FIG. 8 is a block diagram showing a configuration example of an SeNB according to the first to third embodiments.

FIG. 8 is a block diagram showing a configuration example of the SeNB 12. The functions and operations of a radio communication unit 121, a transmission data processing unit 122, a received data processing unit 123, and a communication unit 124, which are shown in FIG. 8, are the same as those of the corresponding elements, i.e., the radio communication unit 111, the transmission data processing unit 112, the received data processing unit 113, and the communication unit 114 in the MeNB 11 shown in FIG. 7.

A communication control unit 125 of the SeNB 12 controls dual connectivity involving a bearer split. In the second and third embodiments, the communication control unit 125 is configured to receive the radio bearer (RB) configuration information, which indicates mapping between the S-RB and the EPS bearer subjected to the bearer split, from the MeNB 11 via the communication unit 124.

Figure 9:
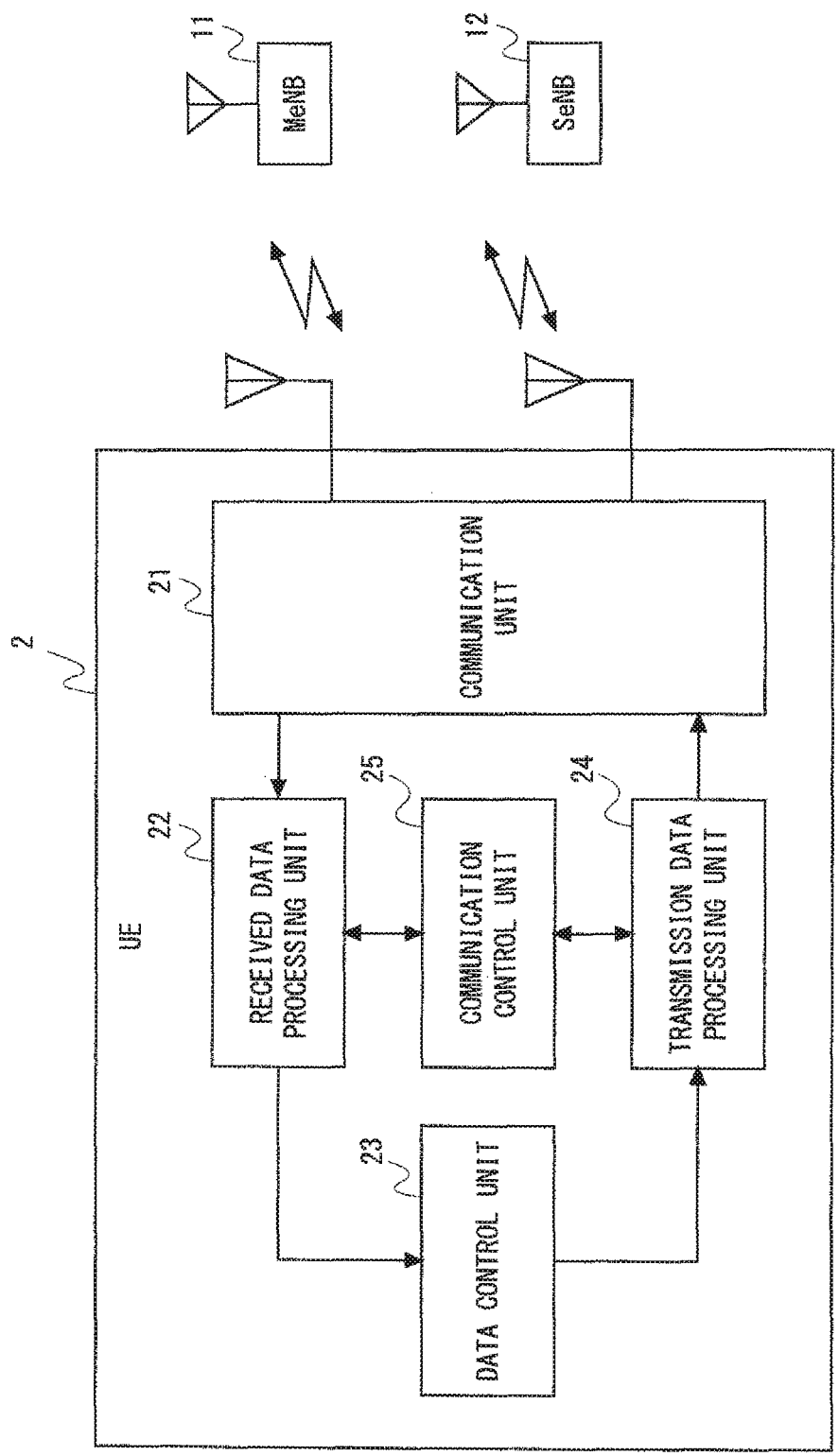
FIG. 9 is a block diagram showing a configuration example of a UE according to the first to third embodiments.

FIG. 9 is a block diagram showing a configuration example of the UE 2. A radio communication unit 21 is configured to support dual connectivity and to communicate simultaneously in a plurality of cells (PCell 110 and SCell 120) served by different eNBs (MeNB 11 and SeNB 12). Specifically, the radio communication unit 21 receives a downlink signal from one or both of the MeNB 11 and the SeNB 12 via an antenna. A received data processing unit 22 recovers received data from the received downlink signal, and sends the recovered data to a data control unit 23. The data control unit 23 uses the received data according to the intended use. A transmission data processing unit 24 and the radio communication unit 21 generate an uplink signal by using data for transmission supplied from the data control unit 23, and transmit the generated uplink signal to one or both of the MeNB 11 and the SeNB 12.

A communication control unit 25 of the UE 2 controls dual connectivity involving a bearer split. As described in the first embodiment, the communication control unit 25 receives from the E-UTRAN 1 (MeNB 11 or SeNB 12) the first control information, which relates to an access stratum and is necessary for dual connectivity involving a bearer split, and controls communication of dual connectivity involving a bearer split based on the first control information.

Other Embodiments

The communication control processes in the MeNB 11, the SeNB 12, and the UE 2 in association with dual connectivity involving a bearer split as described in the first to third embodiments may be implemented by a semiconductor processing device including an Application Specific Integrated Circuit (ASIC). These processes may be implemented by causing a computer system including at least one processor (e.g., a microprocessor, a Micro Processing Unit (MPU), or a Digital Signal Processor (DSP)) to execute a program. Specifically, one or more programs including instructions for causing the computer system to perform algorithms described above with reference to sequence diagrams and the like may be created, and the program(s) may be supplied to a computer.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

In the first to third embodiments, the LTE system is mainly described. However, as described above, these embodiments may be applied to radio communication systems other than the LTE system, such as a 3GPP UMTS, a 3GPP2 CDMA2000 system (1×RTT, HRPD), a GSM/GPRS system, or a WiMAX system.

The above embodiments are only illustrative of the application of the technical idea obtained by the present inventor. That is, the technical idea is not limited only to the above embodiments and can be modified in various ways as a matter of course.

This application is based upon and claims the benefit of priority from Japanese patent application No. 2013-227472, filed on Oct. 31, 2013, the disclosure of which is incorporated herein in its entirety by reference.

REFERENCE SIGNS LIST

1 EVOLVED UTRAN (E-UTRAN)
2 USER EQUIPMENT (UE)
3 EVOLVED PACKET CORE (EPC)
11 MASTER eNodeB (MeNB)
12 SECONDARY eNodeB (SeNB)
25 COMMUNICATION CONTROL UNIT
110 PRIMARY CELL (PCell)
120 SECONDARY CELL (SCell)
115 COMMUNICATION CONTROL UNIT
125 COMMUNICATION CONTROL UNIT

The invention claimed is:

1. A radio terminal configured to perform Dual Connectivity using a first cell operated by a master base station and a second cell operated by a secondary base station, comprising:
a memory storing instructions; and
at least one processor configured to process the instructions to:
receive a first Radio Resource Control (RRC) message including first configuration information related to Dual Connectivity from the master base station, the first RRC message indicating an upper limit of a first transmission power for the first cell, the first configuration information contained in the first RRC message indicating which of the first cell and the second cell is to be used in transmitting data of a split bearer that is split over the master base station and the secondary base station;
receive a second RRC message including second configuration information related to Dual Connectivity from the secondary base station, the second RRC message indicating an upper limit of a second transmission power for the second cell;
determine whether to transmit data of the split bearer in the first cell or the second cell based on the first configuration information contained in the first RRC message;
determine the first transmission power for the first cell using the upper limit of the first transmission power;
determine the second transmission power for the second cell using the upper limit of the second transmission power; and
transmit a first signal carrying both data of a first split bearer and data of a second split bearer on the first cell using the first transmission power, and a second signal carrying both data of the first split bearer and data of the second split bearer on the second cell using the second transmission power by reducing the second transmission power for the second cell such that total radio terminal transmission powers, which are a sum of the first transmission power and the second transmission power, do not exceed an upper limit of the total transmission powers based on the transmitting the first signal on the first cell and the second signal on the second cell being overlapped in time,
wherein the first split bearer is split into a first Radio Link Control (RLC) bearer over the master base station and a first RLC bearer over the secondary base station, and
wherein the second split bearer, different from the first split bearer, is split into a second RLC bearer over the master base station and a second RLC bearer over the secondary base station.

2. A control method in a radio terminal configured to perform Dual Connectivity using a first cell operated by a master base station and a second cell operated by a secondary base station, the control method comprising:
receiving a first Radio Resource Control (RRC) message including first configuration information related to Dual Connectivity from the master base station, the first RRC message indicating an upper limit of a first transmission power for the first cell, the first configuration information contained in the first RRC message indicating which of the first cell and the second cell is to be used in transmitting data of a split bearer that is split over the master base station and the secondary base station;
receiving a second RRC message including second configuration information related to Dual Connectivity from the secondary base station, the second RRC message indicating an upper limit of a second transmission power for the second cell;

determining whether to transmit data of the split bearer in the first cell or the second cell based on the first configuration information contained in the first RRC message;

determining the first transmission power for the first cell using the upper limit of the first transmission power;

determining the second transmission power for the second cell using the upper limit of the second transmission power; and transmitting a first signal carrying both data of a first split bearer and data of a second split bearer on the first cell using the first transmission power, and a second signal carrying both data of the first split bearer and data of the second split bearer on the second cell using the second transmission power by reducing the second transmission power for the second cell such that total radio terminal transmission powers, which are a sum of the first transmission power and the second transmission power, do not exceed an upper limit of the total transmission powers based on the transmitting the first signal on the first cell and the second signal on the second cell being overlapped in time, wherein the first split bearer is split into a first Radio Link Control (RLC) bearer over the master base station and a first RLC bearer over the secondary base station, and wherein the second split bearer, different from the first split bearer, is split into a second RLC bearer over the master base station and a second RLC bearer over the secondary base station.

* * * * *